United States Patent [19]

Kato

[11] 4,088,207

[45] May 9, 1978

[54] DAMPING FORCE GENERATING DEVICE IN HYDRAULIC SHOCK ABSORBER

[75] Inventor: Tetuo Kato, Yokohama, Japan

[73] Assignee: Tokico Ltd., Kawasaki, Japan

[21] Appl. No.: 686,666

[22] Filed: May 14, 1976

[30] Foreign Application Priority Data

May 23, 1975   Japan .................................. 50-61750

[51] Int. Cl.² ............................................. F16F 9/348
[52] U.S. Cl. .................................... 188/322; 188/317
[58] Field of Search .................. 137/493.8, 493.9, 504, 137/513.7; 188/317, 320, 322

[56] References Cited

U.S. PATENT DOCUMENTS

| | | | |
|---|---|---|---|
| 3,164,225 | 1/1965 | de Carbon | 188/320 |
| 3,312,312 | 4/1967 | de Carbon | 188/317 |
| 3,352,387 | 11/1967 | Powell | 188/317 |
| 3,747,714 | 7/1973 | de Carbon | 188/317 |
| 3,837,445 | 9/1974 | Pierle | 188/320 |

*Primary Examiner*—Duane A. Reger

[57] ABSTRACT

A damping force generating device in a hydraulic shock absorber having at least two oil spaces therein and an oil space partitioning member on which the damping force generating device is mounted including an annular resilient valve disc controlling oil flow flowing thereacross in the opposite directions in response to the extension and compression strokes of the shock absorber. A second annular resilient disc is disposed overlapping the valve disc for delaying the valve opening time in either direction of the oil flow.

4 Claims, 6 Drawing Figures

DAMPING FORCE GENERATING DEVICE IN HYDRAULIC SHOCK ABSORBER

This invention relates to damping force generating devices for use in hydraulic shock absorbers and, particularly, to damping force generating devices of the type comprising an annular resilient disc disposed on a liquid space partitioning member such as a piston or a bottom member of the inner cylinder of a dual tube type shock absorber for controlling liquid flow flowing across the liquid space partitioning member when the shock absorber is actuated.

The shock absorbers having damping force generating devices of the aforementioned type are widely used in suspension systems of vehicles such as automobiles or the like for absorbing vibration and affording comfortable driving conditions.

Usually, such shock absorbers are required to have damping force characteristics such that the ratio between the damping force in the extension stroke and the damping force in the contraction stroke is about 2 : 1 to 3 : 1.

For obtaining the damping force characteristics with the aforementioned ratio, one of the prior art shock absorbers comprises a piston having two disc valves on the opposite sides of the piston for acting separately during the extension and contraction strokes of the shock absorbers. By this means it is very easy to afford the desired ratio, but it becomes complicated and expensive.

An object of the present invention is to provide a damping force generating device of the aforementioned type comprising a first annular valve disc for controlling liquid flow flowing across the liquid space partitioning member in the opposite directions in response to the extension and contraction strokes of the shock absorber, and a second valve disc acting to delay the opening time of the first valve disc in either direction.

Preferably, the second valve disc is disposed in overlapping relationship with the first disc, and when liquid flows in one direction the first and second discs are flexed together thereby delaying the valve opening time, and when liquid flows in the opposite direction the second disc simply moves in response to the movement of the first disc and does not act substantially on the valve opening time which is determined by the first disc.

Thus, it is very easy to design the damping force generating device having the desired ratio in the damping force characteristics.

These and other objects and features of the present invention will appear in the following description explaining some embodiments of the invention in connection with the accompanying drawings, in which.

Figure 1:
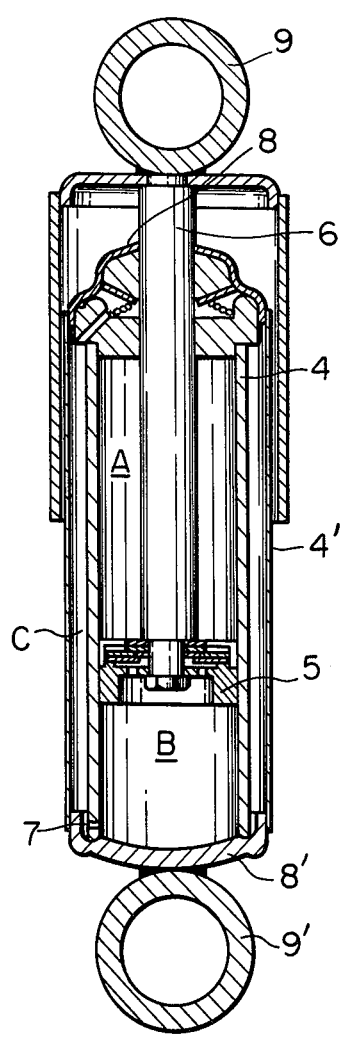
FIG. 1 is a longitudinal cross sectional view of a telescope-type hydraulic shock absorber incorporating a damping force generating device according to the present invention.
Figure 2:
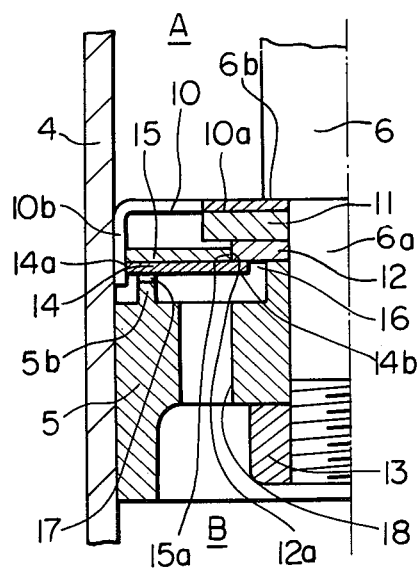
FIG. 2 is an enlarged cross-sectional view of the essential portion of the shock absorber of FIG. 1.

The shock absorber shown in FIG. 1 comprises an inner or pressure cylinder 4 containing oil therein, and a piston 5 working in the cylinder 4. The piston 5 acts as an oil space partitioning member for partitioning the interior of the cylinder 4 into oil spaces A and B as shown. A piston rod 6 connected to the piston 5 extends through the oil space A and projects outwardly from the cylinder 4. An outer cylinder 4' concentrically surrounds the cylinder 4 and defines an oil space C therebetween, which space communicates permanently with the oil space B through an opening 7. The upper portion of the oil space C is filled with air which accomodates the volumetric change of the spaces A and B. The opposite ends of the cylinders 4 and 4' are closed respectively by end plates 8 and 8' and a fitting 9' is secured to the end plate 8'. A fitting 9 is secured to the upper end of the piston rod 6 which projects through the end plate 8. A disc valve mechanism is mounted on the piston 5, and the details of which are shown in FIG. 2.

A reduced diameter stem portion 6a is formed at the lower end portion of the piston rod 6, and a valve guide 10, a washer 11, a valve retainer 12, and the piston 5 are mounted on the stem portion 6a sequentially with the valve guide 10 engaging a shoulder 6b at the shoulder between the large diameter portion of the piston rod 6 and the stem portion 6a, and they are retained in position by a nut 13 threadingly engaging with the lower end of the stem portion 6a. A first annular resilient disc 14 is slidably engaged with downwardly bent leg portions 10b of the valve guide 10, and the outer peripheral portion 14a of the disc 14 seats on an annular seat surface 5b formed on the piston 5, and the inner peripheral portion 14b of the disc 14 abuts the underside surface of the valve retainer 12. In the normal inoperative condition, the disc 14 is flexed to some extent under an initial load.

A second annular resilient disc 15 is located in relation on the first disc 14 with the outer periphery thereof also slidably engaging the leg portions 10b of the valve guide 10 and the inner peripheral surface 15a thereof engaging the outer peripheral surface 12a of the retainer 12. An annular space 16 is formed between the inner diameter of the first disc 14 and the outer periphery of the adjacent axially extending portion of the piston 5 for affording a fluid passage during the extension stroke of the shock absorber.

A cut-out 17 portion acting as an fixed orifice permanently connecting the oil spaces A and B with each other is formed in the annular seat 5B. An axial bore 18 is formed in the piston 5.

The damping force generating the device having the above-described construction operates as follows. When the shock absorber extends, namely, the piston 5 moves upward relative to the cylinder 4, oil in the oil space A flows into the oil space B through the fixed orifice 17 generating a damping force along line OJD in FIG. 3.

Figure 3:
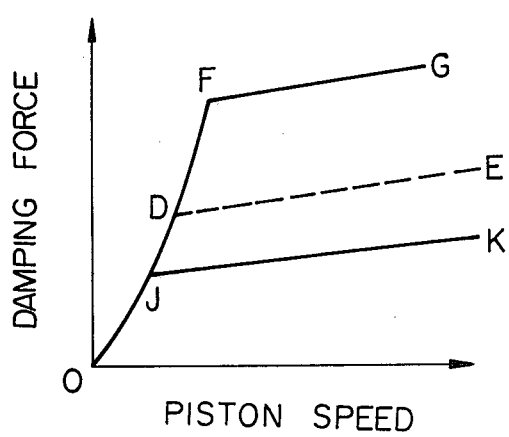
FIG. 3 is a diagram showing the damping force characteristics.

When the piston speed increases, oil pressure in the oil space A increases and the first disc 14 starts to flex such that the inner peripheral portion 14b moves away from the valve retainer 12 (the point D in FIG. 3), but, the second disc flexes also in the same direction and the inner peripheral surface 15a remains in engagement with the outer peripheral surface 12a of the valve retainer 12, so that no oil passage between the inner peripheral portions of the discs 14 and 15 and the valve guide 12 is formed, and the damping force increases along line DF in FIG. 3.

When pressure in the oil space A increases further, the first and second discs 14 and 15 flex further and an annular oil passage will be formed between the discs 14 and 15 and the valve retainer 12, and the damping force will increase along line FG in FIG. 3.

By changing the thickness of the second disc 15, it is possible to change the position of the point F in FIG. 3. Incidentally, the line DE in FIG. 3 shows the damping force characteristic obtained by omitting the second disc 15.

Figure 7:
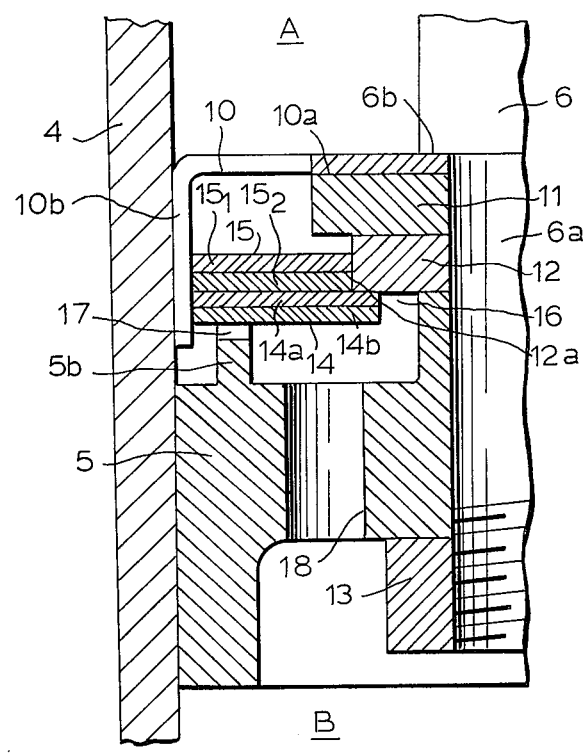
FIG. 7 is a view similar to FIG. 2 of a further modified form of the invention.

It will be clear that the second disc 15 may be replaced by two or more annular resilient discs $15_1$ and $15_2$ overlapping each other as shown in FIG. 7.

In the contraction stroke of the shock absorber, the piston 5 moves downward in FIGS. 1 and 2. Initially, oil in the oil space B flows through the fixed orifice 17 and the damping force increases along the line OJ in FIG. 3. When the speed of the piston 5 reaches a predetermined value, pressure in the oil space B will flex the first valve 5 such that the outer peripheral portion 14a of the disc 14 separates from the seat surface 5b of the piston 5 to form an annular oil passage between the first disc 14 and the piston 5, and the damping force changes along the line JK in FIG. 3. At that time, the second disc 15 moves upward along with the movement of the outer peripheral portion of the first disc 14 and will not have any substantial effect in generating the damping force. Therefore, the damping force in the contraction stroke of the shock absorber is substantially smaller than that in the extension stroke.

In the present embodiment, the washer 11 acts to prevent the second disc 15 from falling off during the contraction stroke, but it is possible to omit the washer 11 by increasing the diameter of the rod 6. Further, the outside diameter of the second disc 15 may be smaller than that of the first disc 14.

Figure 4:
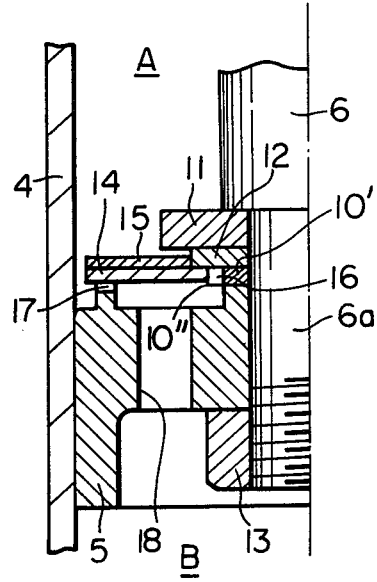
FIG. 4 is a view similar to FIG. 2 but showing a modified form of the invention.
Figure 5:
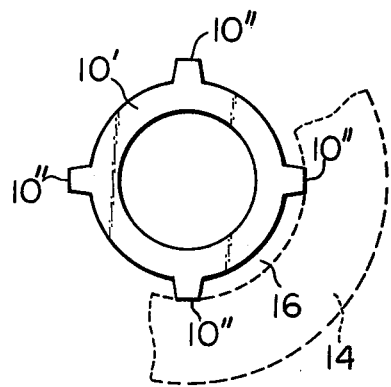
FIG. 5 is a plan view of a valve guide incorporated in the piston of FIG. 4.

In the embodiment shown in FIGS. 1 and 2, the transverse movement of the discs 14 is restricted by the valve guide 10, but, in the second embodiment shown in FIGS. 4 and 5, the first annular resilient disc 14 is guided by a valve guide 10' having radially extending projections 10'' on the outer periphery thereof which engage with and slidably guide the inner periphery of the first disc 14. Thus, the movement of the disc 14 in the transverse direction is prevented by the projections 10''.

Figure 6:
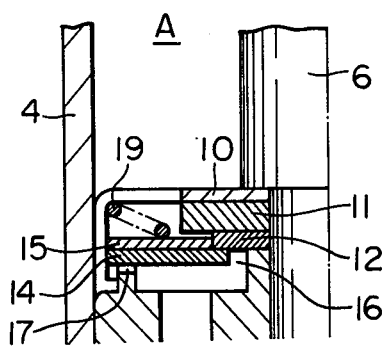
FIG. 6 is a view similar to FIGS. 2 and 4 but showing another modified form of the invention.

The embodiment shown in FIG. 6 is similar to the first embodiment shown in FIG. 2, and the main difference therebetween is that a coil spring 19 is disposed between the second disc 15 and the valve guide 10 for taking up the clearance between the first and second discs 14 and 15 and urging the second disc 15 against the first disc 14. The embodiment is particularlfy adapted for use in a shock absorber used or mounted in a horizontal attitude or inverted attitude or in circumstances where high frequency vibrations are present.

It will be noted that the damping force generating devices in the various embodiments are disposed between the oil spaces A and B, but the device according to the present invention may be disposed between oil spaces B and C. Further, the valve discs 14 in the drawings are arranged such that the inner peripheral portions are flexed in the extension stroke of the shock absorber and annular valve openings are formed at the outer peripheral portions of the discs in the contraction stroke, but it is possible to arrange the discs such that the outer peripheries will flex in the extension stroke and the inner peripheral portions will flex in the contraction stroke.

As hereinbefore described, the damping force generating device according to the present invention can substantially prevent liquid flow between oil spaces which are partitioned by a oil space partitioning member even though the first valve disc is flexed amply in one direction of the stroke of the shock absorber until the second disc has been flexed by a predetermined amount; thus, when the first and second discs are flexed to form a valve opening for allowing oil flow therethrough, no abrupt pressure change will be observed adjacent or around the first disc and the occurance of the natural vibration of the first disc can be prevented. Further, by changing the thickness or the number of sheets constituting the second disc it is easily possible to regulate the opening time of the valve and to determine the ratio of damping forces between the extension and contraction strokes of the shock absorber as desired.

What is claimed is:

1. In a hydraulic shock absorber having therein at least two liquid spaces, and a liquid space partitioning member partitioning said two spaces, a damping force generating device mounted on the liquid space partitioning member for controlling oil flow flowing across the liquid space partitioning member in the opposite directions in response to the extension and contraction strokes of the shock absorber, said device comprising a first annular resilient valve disc and a second annular resilient valve disc in overlapping relation with one another, and an annular member secured to the liquid space partitioning member, the outer peripheral surface of said annular member being slidably engaged by the inner peripheral surface of the second disc, and one face of said annular member being engaged by the inner peripheral portion of one face of the first disc to act as a valve seat in cooperation with said first disc.

2. A damping force generating device as claimed in claim 1, further comprising a spring urging said second disc against said first disc.

3. A damping force generating device as claimed in claim 1, wherein the liquid space partitioning member is a piston.

4. A damping force generating device as claimed in claim 1, said second disc comprises a plurality of annular sheets overlapping each other.

* * * * *